(12) United States Patent
Yamamoto

(10) Patent No.: US 11,430,147 B2
(45) Date of Patent: Aug. 30, 2022

(54) IMAGE PROCESSING APPARATUS, IMAGING APPARATUS, MOBILE BODY, AND IMAGE PROCESSING METHOD

(71) Applicant: KYOCERA Corporation, Kyoto (JP)

(72) Inventor: Kenji Yamamoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/288,829

(22) PCT Filed: Oct. 1, 2019

(86) PCT No.: PCT/JP2019/038805
§ 371 (c)(1),
(2) Date: Apr. 26, 2021

(87) PCT Pub. No.: WO2020/090329
PCT Pub. Date: May 7, 2020

(65) Prior Publication Data
US 2021/0358159 A1 Nov. 18, 2021

(30) Foreign Application Priority Data
Oct. 29, 2018 (JP) .............................. JP2018-203192

(51) Int. Cl.
*G06T 7/593* (2017.01)
*H04N 13/239* (2018.01)

(52) U.S. Cl.
CPC ............ *G06T 7/593* (2017.01); *H04N 13/239* (2018.05); *G06T 2207/30252* (2013.01)

(58) Field of Classification Search
CPC .......... G06T 7/593; G06T 2207/30252; H04N 13/239

USPC .......................................................... 348/47
See application file for complete search history.

(56) References Cited

U.S. PATENT DOCUMENTS

2014/0307925 A1* 10/2014 Uemori ................. G06T 7/0012
382/106
2019/0342538 A1* 11/2019 Sun ...................... H04N 13/211

FOREIGN PATENT DOCUMENTS

JP H07-152914 A 6/1995

OTHER PUBLICATIONS

Anders Eriksson et al.; "Efficient Computation of Robust Low-Rank Matrix Approximations in the Presence of Missing Data using the L1 Norm", 2010; pp. 771-778; XP031725964; IEEE.

* cited by examiner

*Primary Examiner* — On S Mung
(74) *Attorney, Agent, or Firm* — Studebaker & Brackett PC

(57) ABSTRACT

An image processing apparatus 10 includes an interface 12 configured to acquire a stereo image that includes a standard image and a reference image captured from different viewpoints and a processor 13 configured to perform low-rank approximation by singular value decomposition on the standard image and the reference image, and calculate a parallax by performing stereo matching processing between the standard image and the reference image that are subjected to the low-rank approximation by the singular value decomposition.

10 Claims, 15 Drawing Sheets
(12 of 15 Drawing Sheet(s) Filed in Color)

RIGHT IMAGE

LEFT IMAGE

Disparity Map

RIGHT IMAGE

LEFT IMAGE

Disparity Map

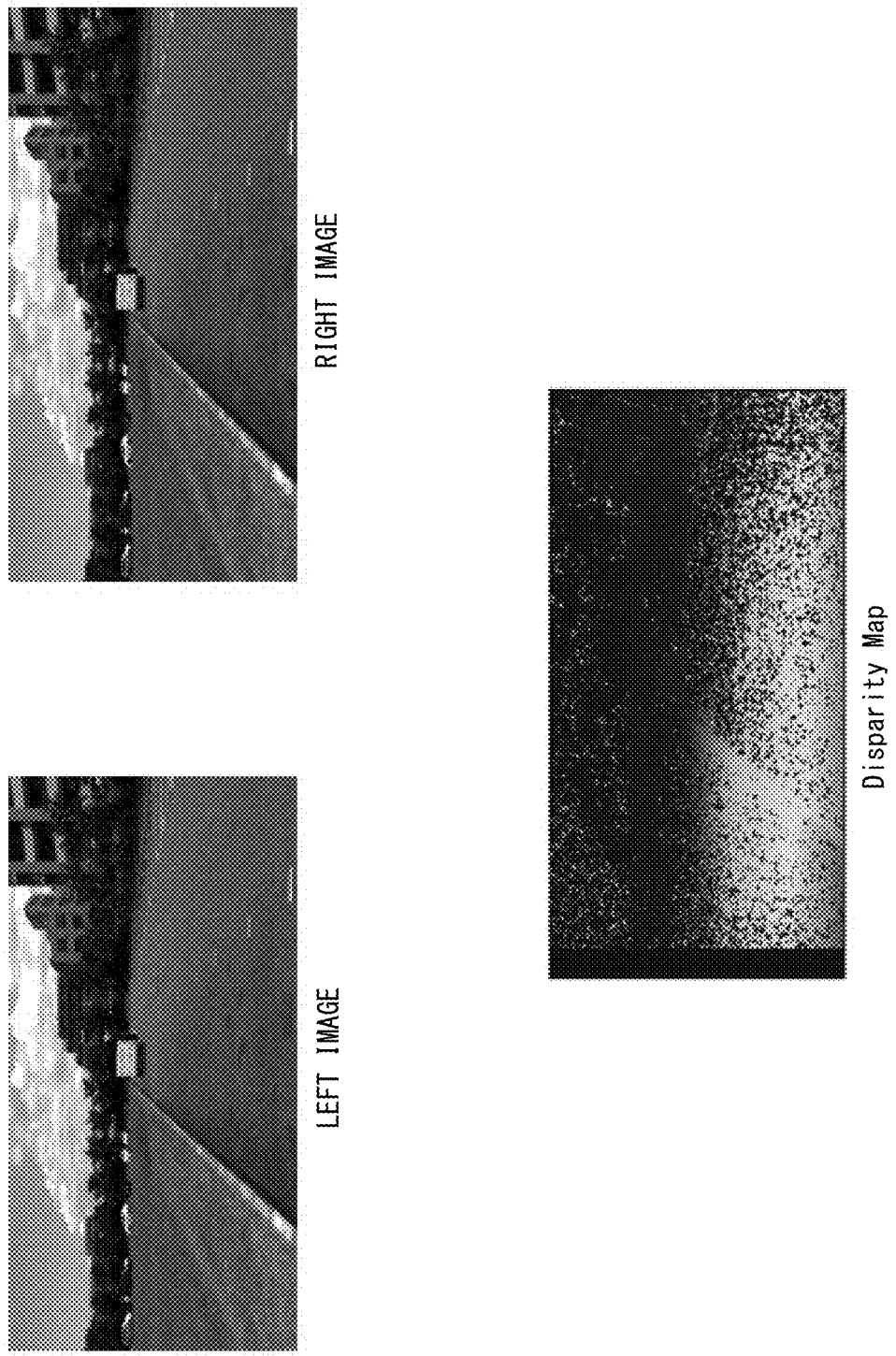

LEFT IMAGE

RIGHT IMAGE

Disparity Map

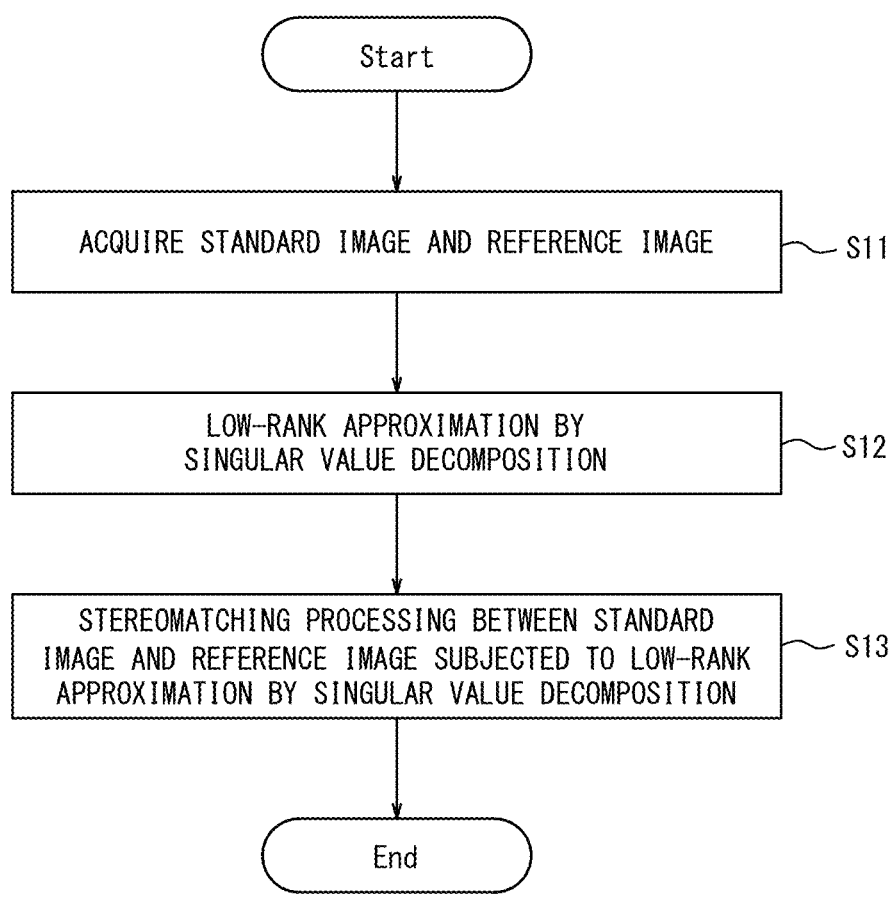

IMAGE PROCESSING APPARATUS, IMAGING APPARATUS, MOBILE BODY, AND IMAGE PROCESSING METHOD

CROSS REFERENCE TO RELATED APPLICATION

This application claims priority to and the benefit of Japanese Patent Application No. 2018-203192 filed on Oct. 29, 2018, the entire contents of which are incorporated herein by reference.

TECHNICAL FIELD

The present disclosure relates to an image processing apparatus, an imaging apparatus, a mobile body, and an image processing method.

BACKGROUND

A known technique relates to detecting a distance to an object using a pair of stereo images obtained by imaging an object located outside a vehicle using an imaging system mounted on the vehicle. This technique uses one of the pair of stereo images as a standard image and the other image as a comparison image, calculates a difference (a parallax) between corresponding positions in the reference image and the comparison image by performing stereo matching processing, and obtains distance information regarding a distance to the object using a calculated parallax, based on a principle of triangulation.

SUMMARY

An image processing apparatus according to an aspect includes an interface configured to acquire a stereo image that includes a standard image and a reference image captured from different viewpoints; and a processor configured to perform low-rank approximation by singular value decomposition on the standard image and the reference image, and calculate a parallax by performing stereo matching processing between the standard image and the reference image that are subjected to the low-rank approximation by the singular value decomposition.

An imaging apparatus according to an aspect includes: a first imaging unit that includes a first imaging optical system and a first image sensor configured to capture an image formed via the first imaging optical system; a second imaging unit that includes a second imaging optical system and a second image sensor configured to capture an image formed via the second imaging optical system and is configured to capture from a different viewpoint that is different from a viewpoint of the first imaging unit; an interface configured to acquire a stereo image including a standard image captured by the first imaging unit and a reference image captured by the second imaging unit from the different viewpoint; and a processor configured to perform low-rank approximation by singular value decomposition on the standard image and the reference image, and calculate a parallax by performing stereo matching processing between the standard image and the reference image that are subjected to the low-rank approximation by the singular value decomposition.

A mobile body according to an aspect includes an imaging apparatus configured to capture surroundings of the mobile body. The imaging apparatus includes: a first imaging unit that includes a first imaging optical system and a first image sensor configured to capture an image formed via the first imaging optical system; a second imaging unit that includes a second imaging optical system and a second image sensor configured to capture an image formed via the second imaging optical system and is configured to capture from a different viewpoint that is different from a viewpoint of the first imaging unit; an interface configured to acquire a stereo image including a standard image captured by the first imaging unit and a reference image captured by the second imaging unit from the different viewpoints; and a processor configured to perform low-rank approximation by singular value decomposition on the standard image and the reference image, and calculate a parallax by performing stereo matching processing between the standard image and the reference image that are subjected to the low-rank approximation by the singular value decomposition.

An image processing method according to an aspect is an image processing method of an image processing apparatus and includes: acquiring a stereo image including a standard image and a reference image that are captured from different viewpoints; and performing low-rank approximation by singular value decomposition on the standard image and the reference image and calculating a parallax by performing stereo matching processing between the standard image and the reference image that are subjected to the low-rank approximation by the singular value decomposition.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the accompanying drawings:

FIG. 5A is a diagram illustrating an original left image, an original right image, and a disparity map acquired, in a case in which the distance to the vehicle located in front is 30 m;

FIG. 6 is a flowchart for explaining an image processing method of the image processing apparatus illustrated in FIG. 1.

DETAILED DESCRIPTION

Figure 1:
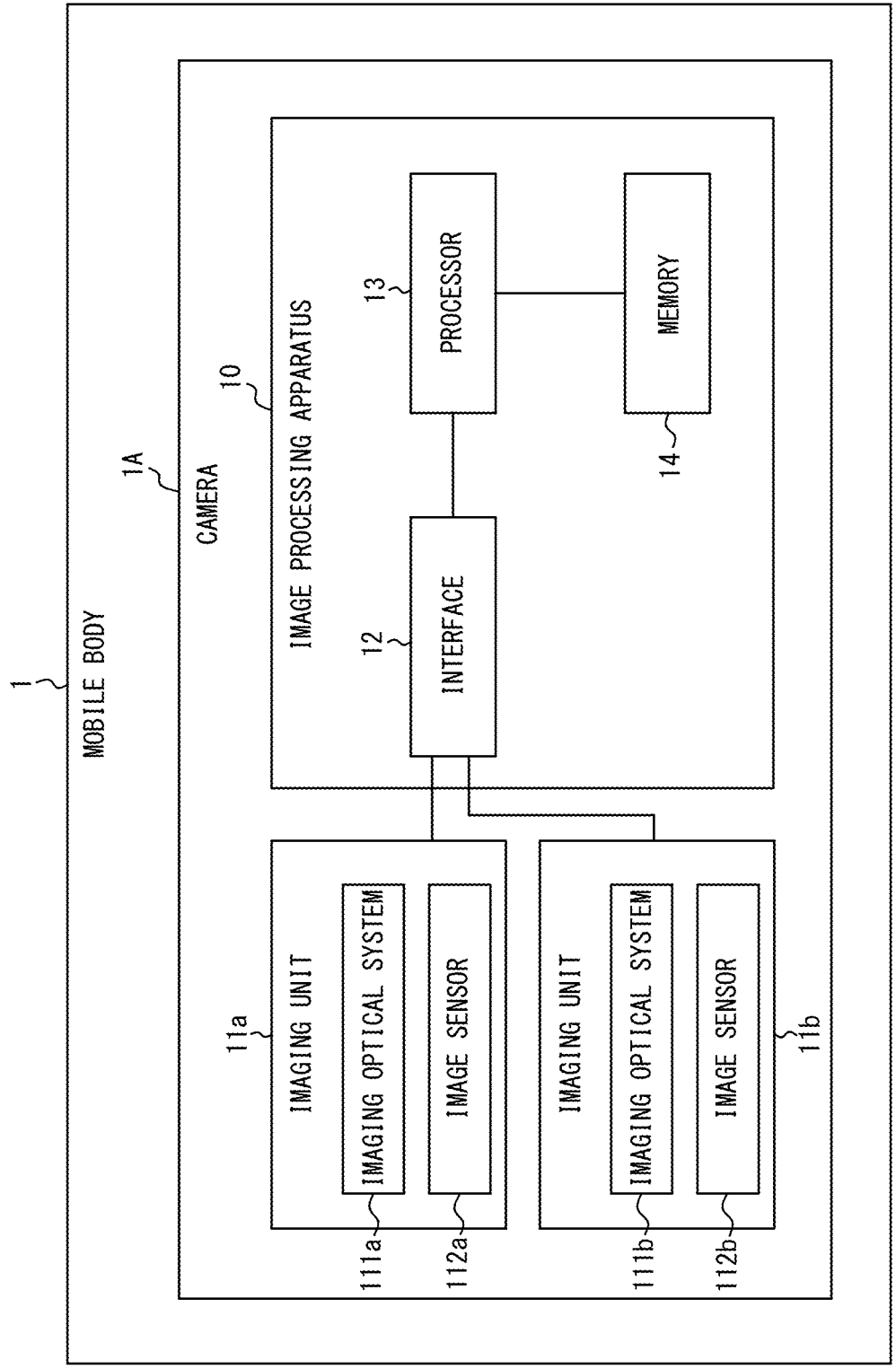
FIG. 1 is a diagram illustrating an example configuration of an image processing apparatus according to an embodiment of the present disclosure.

In performing distance detection by stereo matching processing, it is advantageous to reduce processing load while suppressing a decrease in detection accuracy. According to an aspect of the present disclosure, the processing load of the stereo matching processing can be reduced and, simultaneously, a decrease in detection accuracy of a distance by the stereo matching processing is suppressed.

Hereinafter, embodiments of the present disclosure will be described with reference to the drawings. In the drawings, the same reference numerals denote the same or equivalent elements.

FIG. 1 is a diagram illustrating an example configuration of an image processing apparatus 10 according to an embodiment of the present disclosure. The image processing apparatus 10 according to the present embodiment is configured to calculate a difference (a parallax) between positions in corresponding portions of a standard image and a reference image by performing the stereo matching processing using a pair of stereo images including a standard image and a reference image, and to acquire distance information using the parallax. The image processing apparatus 10 is mounted on, for example, a mobile body 1, as illustrated in FIG. 1. In a case in which the image processing apparatus 10 is mounted on the mobile body 1, the image processing apparatus 10 is configured to acquire distance information regarding a distance to a subject such as a person or another vehicle included in the pair of stereo images capturing the surroundings of the mobile body 1. Hereinafter, the image processing apparatus 10 will be described as being mounted on the mobile body 1.

The mobile body 1 according to the present disclosure is, for example, a vehicle. The vehicle may include automobiles and industrial vehicles. Vehicles are not limited thereto but may also include rail vehicles, domestic vehicles, and fixed-wing aircraft that travel on a runway. Automobiles include cars, trucks, buses, motorcycles, and trolley buses. Automobiles are not limited thereto and may also include other automobiles that travel on the road. Industrial vehicles include agricultural vehicles and construction vehicles. Industrial vehicles include, but are not limited to, forklifts and golf carts. Industrial vehicles for agricultural purpose include, but are not limited to, tractors, tillers, transplanters, binders, combined harvesters, and lawn mowers. Industrial vehicles for construction purposes include, but are not limited to, bulldozers, scrapers, excavators, crane trucks, dump trucks, and load rollers. The vehicles may include human-powered vehicles that travel on human power. Classification of the vehicles is not limited to the above. For example, vehicles may include industrial vehicles authorized to travel on the road, and a plurality of categories may include the same type of vehicle.

The image processing apparatus 10 illustrated in FIG. 1 includes an interface 12, a processor 13, and a memory 14. The mobile body 1 includes an imaging unit 11a serving as a first imaging unit configured to acquire an image capturing the surroundings of the mobile body 1 and an imaging unit 11b serving as a second imaging unit. The image processing apparatus 10, the imaging unit 11a, and the imaging unit 11b together constitute an imaging apparatus 1A mounted on the mobile body 1. Hereinafter, when the imaging unit 11a and the imaging unit 11b are not distinguished from each other, they will be referred to as an imaging unit 11. First, the imaging unit 11 will be described.

The imaging unit 11 is an in-vehicle camera mounted on the mobile body 1. The imaging unit 11 is configured to acquire an image capturing the surroundings of the mobile body 1. The imaging unit 11 includes at least an imaging optical system and an image sensor. That is, the imaging unit 11a includes an imaging optical system 111a serving as a first imaging optical system and an image sensor 112a serving as a first image sensor. Further, the imaging unit 11b includes an imaging optical system 111b serving as a second imaging optical system and an image sensor 112b serving as a second image sensor. Hereinafter, when the imaging optical system 111a and the imaging optical system 111b are not distinguished from each other, they will be referred to as an imaging optical system 111. Also, when the image sensor 112a and the image sensor 112b are not distinguished from each other, they will be referred to as an image sensor 112.

The imaging optical system 111 includes one or more optical members such as, for example, a lens and an aperture. The lens included in the imaging optical system 111 may be a lens having a wide angle of view, such as a fisheye lens. The imaging optical system 111 is configured to form a subject image on a light receiving surface of the image sensor 112. The image sensor 112 includes, for example, a CCD (Charge Coupled Device) image sensor or a CMOS (Complementary Metal-Oxide Semiconductor) image sensor. A plurality of pixels are arranged on the light receiving surface of the image sensor 112. The image sensor 112 is configured to capture the subject image formed on the light receiving surface and generate an image. The imaging unit 11 may output the captured image to an external device such as an ECU (Electronic Control Unit), a display, a navigation device, or the like mounted on the mobile body 1. Further, the imaging unit 11 may have a function of performing predetermined image processing such as white balance adjustment processing, exposure adjustment processing, and gamma correction processing on the captured image.

The imaging unit 11a and the imaging unit 11b are arranged, for example, on a front surface of the mobile body 1 in a manner facing slightly downward such that their optical axes are parallel to each other. The imaging unit 11a and the imaging unit 11b are arranged side by side being spaced apart from each other in a width direction of the mobile body 1. Thus, the imaging unit 11a and the imaging unit 11b capture images of substantially the same range from different viewpoints. In a case in which the mobile body 1 is, for example, an automobile, the imaging unit 11a and the imaging unit 11b are installed on an inner side of a windshield of the automobile.

Hereinafter, an image captured by the imaging unit 11a will be referred to as "standard image", and an image captured by the imaging unit 11b will be referred to as "reference image". As described above, the imaging unit 11a and the imaging unit 11b capture images of substantially the same range from different viewpoints. Thus, the reference image and the reference image are stereo images capturing substantially the same range from different viewpoints. Also, the standard image and the reference image are images captured at the same timing or substantially the same timing by the imaging unit 11a and the imaging unit 11b. The term "substantially the same" encompasses a time difference between a time when the reference image is captured and a time when the reference image is captured which does not affect detection of a distance in the stereo matching processing, which will be described later.

Next, a configuration of the image processing apparatus 10 will be described.

The interface 12 communicates with various elements included in the mobile body 1 in a wired or wireless manner. For example, the interface 12 acquires the standard image captured by the imaging unit 11a and outputs the standard image to the processor 13. Also, the interface 12 acquires the reference image captured by the imaging unit 11b and outputs the reference image to the processor 13. Hereinafter, the standard image and the reference image acquired by the interface 12 will also be referred together as an "acquired image".

The processor 13 includes, for example, a specialized processor such as a DSP (Digital Signal Processor), a GPU (Graphics Processing Unit) or an FPGA (Field-Programmable Gate Array), or a general purpose processor such as a CPU (Central Processing Unit). The processor 13 controls an operation of the image processing apparatus 10 as a whole. For example, the processor 13 calculates a parallax by performing the stereo matching processing using the standard image and the reference image acquired by the interface 12 and acquires distance information using the parallax. The stereo matching processing is processing for obtaining a parallax by matching corresponding regions between the standard image and the reference image captured from different viewpoints and calculating distance information with respect to an object included in an image from the imaging apparatus 1A using the parallax. The stereo matching processing can be performed using any appropriate known method. For example, the stereo matching processing can be performed using StereoBM serving as a function of OpenCV3 provided as an image processing library. The stereo matching processing using the standard image and the reference image will be described in detail later.

The memory 14 includes, for example, a primary storage device or a secondary storage device. The memory 14 stores various information and programs necessary for the operation of the image processing apparatus 10.

Next, the stereo matching processing using the standard image and the reference image performed by the processor 13 will be described.

The processor 13 performs mathematical processing on the images acquired by the interface 12 and performs the stereo matching processing using the processed images. In particular, the processor 13 performs low-rank approximation by singular value decomposition on the acquired images and then performs the stereo matching processing using the images subjected to the low-rank approximation.

The processor 13 generates a matrix M corresponding to the acquired image. The matrix M corresponding to the acquired image is a matrix representation of the acquired image. An image normally consists of a plurality of pixels arranged in a row direction and a column direction. The processor 13 generates, for example, the matrix M in which a brightness value of each pixel of the acquired image is an element corresponding to a position of each pixel. Then, the processor 13 performs the singular value decomposition on the matrix M. The singular value decomposition is a commonly used mathematical process that, although detailed description thereof will be omitted, decomposes a matrix M constituting any number of m×n into three matrix elements A, B, and C, as indicated by the following equation (1):

$$M=ABC \qquad \text{equation (1)}.$$

In equation (1), A is a left singular value matrix having an orthogonal matrix of m×m, B is a diagonal matrix of m×n, and C is a right singular value matrix having an orthogonal matrix of n×n. The diagonal matrix B (a first diagonal matrix) is a matrix in which diagonal components are positive values or 0 and non-diagonal components are 0. The diagonal components of the diagonal matrix B are arranged in descending order from the one with the highest value. Among the diagonal components of the diagonal matrix B, the number of components that is not zero will be referred to as a rank k.

The processor 13 performs the low-rank approximation after performing the singular value decomposition described above. In particular, the processor 13 generates a diagonal matrix B' (a second diagonal matrix) in which a rank of the diagonal matrix B is lowered to k−1. Here, the processor 13 generates the diagonal matrix B' by setting one diagonal component to zero in order from a component having the smallest value, from among the k-number of diagonal components of the diagonal matrix B that are not zero. That is, the processor 13 generates the diagonal matrix B' in which the rank of the diagonal matrix B is lowered. Then, the processor 13 generates an image corresponding to a matrix M' acquired from an inner product of the left singular value matrix A, the diagonal matrix B' in which the rank of the diagonal matrix B is lowered, and the right singular value matrix C, as an image subjected to the low-rank approximation.

The processor 13 calculates the matrix M' described above for each of the standard image and the reference image. Subsequently, the processor 13 performs the stereo matching processing using an image corresponding to the matrix M' calculated for the standard image and an image corresponding to the matrix M' calculated for the reference image. Hereinafter, the image corresponding to the matrix M' calculated for the standard image will be referred to as a standard image subjected to the low-rank approximation by the singular value decomposition. Also, the image corresponding to the matrix M' calculated for the reference image will be referred to as a reference image subjected to the low-rank approximation by the singular value decomposition. The processor 13 calculates a parallax by performing the stereo matching processing between the standard image and the reference image that are subjected to the low-rank approximation by the singular value decomposition.

As described above, the matrix M' is acquired from the inner product of the left singular value matrix A, the diagonal matrix B' in which the rank of the diagonal matrix B is lowered, and the right singular value matrix C. The diagonal matrix B' includes more diagonal components having values of zero than the diagonal matrix B. Due to such a sparsity of the diagonal matrix B', the processor 13 can reduce the processing load required for the stereo matching processing. For example, the processor 13 can reduce the processing load by omitting a calculation for obvious results such as x (any value)×0=0, or x (any value)+0=x.

Further, the diagonal matrix B' is obtained by setting a predetermined number of diagonal components, from among the diagonal components of the diagonal matrix B, to zero in order from the diagonal component having the lowest value. Thus, in the image subjected to the low-rank approximation by the singular value decomposition, a portion of the acquired image that lacks characteristics is preferentially compressed. As a result, characteristic portions necessary for the stereo matching processing remain in the standard image and the reference image that are subjected to the low-rank approximation by the singular value decomposition, whereby a decrease in the accuracy of the distance detection is suppressed.

Generally, using an image having high resolution is conceived to improve the accuracy of the stereo matching processing. However, using an image having high-resolution increases the processing load and time required for the stereo matching processing. Also, reducing the resolution of an image is conceived to reduce the processing load of the stereo matching processing. However, reducing the resolution of an image also reduces the resolution of characteristic portions required for the stereo matching processing, whereby the accuracy of the stereo matching processing decreases. On the other hand, because the low-rank approximation by the singular value decomposition is performed in the present embodiment, the processing load can be reduced while a decrease in the accuracy of detection of a distance in the stereo matching processing is suppressed.

The processor 13 determines the rank of the diagonal matrix B' according to a characteristics amount of the image required for the stereo matching processing. That is, the processor 13 determines the rank of the diagonal matrix B' according to a desired characteristics amount in the standard image and the reference image that are subjected to the low-rank approximation by the singular value decomposition. For example, the processor 13 acquires the characteristics amount in the image subjected to the low-rank approximation by the singular value decomposition in each rank while changing the rank of the diagonal matrix B' by a predetermined value, and determines the rank of the diagonal matrix B' according to a desired characteristics amount, based on a relationship between the rank of the diagonal matrix B' and the characteristics amount in the image subjected to the low-rank approximation by the singular value decomposition. The processor 13 acquires the relationship between the rank of the diagonal matrix B' and the characteristics amount in the image subjected to the low-rank approximation by the singular value decomposition varies in at least one of the standard image and the reference image and, based on the relationship, determines the desired characteristic amount of in the standard image and the reference image and the rank of the diagonal matrix B'.

The relationship between the rank of the diagonal matrix B' and the characteristics amount in the image subjected to the low-rank approximation by the singular value decomposition varies between images. Thus, it is necessary to perform the calculation to obtain the relationship between the rank of the diagonal matrix B' and the characteristics amount in the image subjected to the low-rank approximation by the singular value decomposition for each image. However, even including this calculation the stereo matching processing of the present embodiment can reduce the processing load as compared with that of stereo matching processing that uses the acquired image itself. Note that the characteristics amount means an amount of characteristic portions necessary for the stereo matching processing such as edges of an object and can be expressed using, for example, a spatial frequency.

Further, the processor 13 may determine the desired characteristics amount according to an area of the image.

Figure 2:
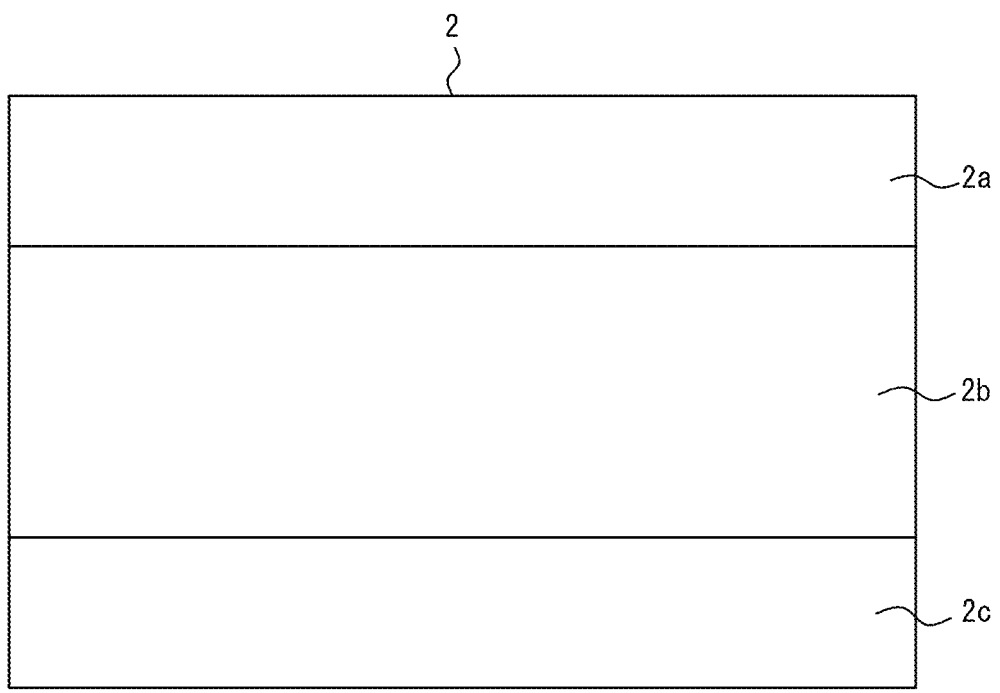
FIG. 2 is a diagram for explaining an example desired characteristics amount determined by a processor illustrated in FIG. 1.

For example, in an image capturing the front side of the mobile body 1, an object such as the sky having a small influence on progress of the mobile body 1 is often included in an upper portion of the image, and an object such as another mobile body 1 or a pedestrian having a large influence on the progress of the mobile body 1 is often included in a central portion of the image. That is, the upper portion of the image capturing the front side of the mobile body 1 often includes an object having a low necessity to acquire highly accurate distance information thereof, and the central portion of the image often includes an object having a high necessity to acquire highly accurate distance information thereof. Further, a lower portion of the image obtained by capturing the front side of the mobile body 1 often includes an object that has appeared in the central portion of the image whose distance information has been acquired and is relatively approaching the mobile body 1 along with the progress of the mobile body 1. As described above, an image includes an area for which more accurate distance information should be acquired. Thus, the processor 13 may determine a desired characteristics amount according to an area of the acquired image and determine the rank of the diagonal matrix B' for each area according to the desired characteristics amount. For example, the processor 13 may increase the desired characteristics amount in a central portion 2b of the acquired image 2, reduce desired characteristics in an upper portion 2a of the acquired image 2, and set the desired characteristics amount in a lower portion 2c to a value between the characteristics amount in the upper portion 2a and the characteristics amount in the central portion 2b, as illustrated in FIG. 2.

The processor 13 may determine a desired characteristics amount according to a behavior of the mobile body 1. For example, the processor 13 may increase the desired characteristics amount when the mobile body 1 is progressing at high speed and reduce the desired characteristics amount when the mobile body 1 is progressing at low speed.

Further, in a case in which a frame rate at which the imaging unit 11 images is variable, the processor 13 may determine the frame rate and the desired characteristics amount, according to a behavior of the mobile body 1. For example, when the mobile body 1 is progressing at high speed, it can be said that the mobile body 1 is progressing on a highway. When the mobile body 1 is progressing on the highway, a moving amount of the mobile body 1 per unit time is large, and thus it is desired that the imaging intervals of the imaging unit 11 are not too long. Further, because of the large amount of movement of the mobile body 1 per unit time, it is desired to reduce time required for the stereo matching processing. Thus, when the mobile body 1 is progressing, for example, on the highway, the processor 13 increases the frame rate of the imaging unit 11 and, simultaneously, reduces the desired characteristics amount.

For example, when the mobile body 1 is progressing at low speed, it can be said that the mobile body 1 is progressing in an urban area. When the mobile body 1 is progressing in the urban area, the amount of movement of the mobile body 1 per unit time is small. However, there is a high possibility that a pedestrian runs out in front of the mobile body 1, and thus distance information is often required to be highly accurate. Thus, for example, when the mobile body 1 is progressing at low speed, the processor 13 reduces the frame rate of the imaging unit 11 and increases the desired characteristics amount. In this way, the processor 13 can perform the matching processing according to a situation in which the mobile body 1 is progressing.

Next, actual stereo images and disparity maps obtained by performing the stereo matching processing using the stereo images are illustrated in FIG. 3A to FIG. 3D, FIG. 4A to FIG. 4D, and FIG. 5A to FIG. 5D. In particular, a left image and a right image which are images obtained by imaging the front side of the mobile body 1 respectively by the imaging unit 11a and the imaging unit 11b arranged side by side in a left-right direction and disparity maps obtained by performing the stereo matching processing using the left image and the right image are illustrated, by way of example. The disparity map is an image obtained by mapping a parallax for each corresponding portions between the left image and the right image. In FIG. 3A to FIG. 3D, FIG. 4A to FIG. 4D, and FIG. 5A to FIG. 5D, a rectangular area located in an approximate center of each of the left image and the right image is a region corresponding to an image of a vehicle located in front of the mobile body 1.

FIG. 3A to FIG. 3D each illustrates a left image, a right image, and a disparity map obtained using the left image and the right image, in a case in which a distance to a vehicle located in front is 5 m.

Figure 3A:
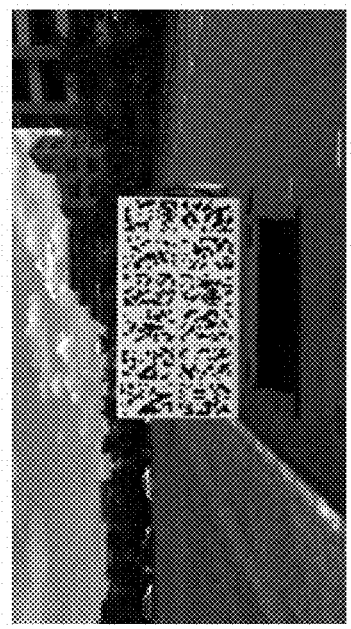
FIG. 3A is a diagram illustrating an original left image, an original right image, and a disparity map acquired, in a case in which a distance to a vehicle located in front is 5 m.
Figure 3A:
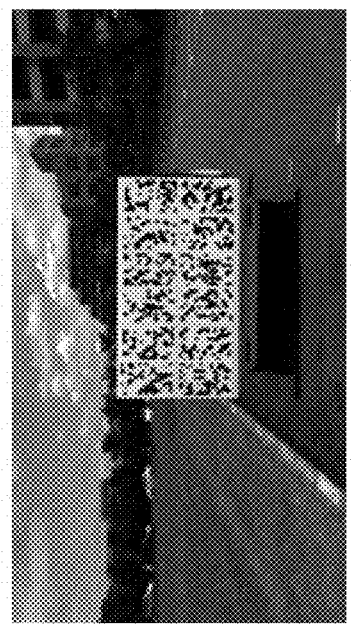
Figure 3A:
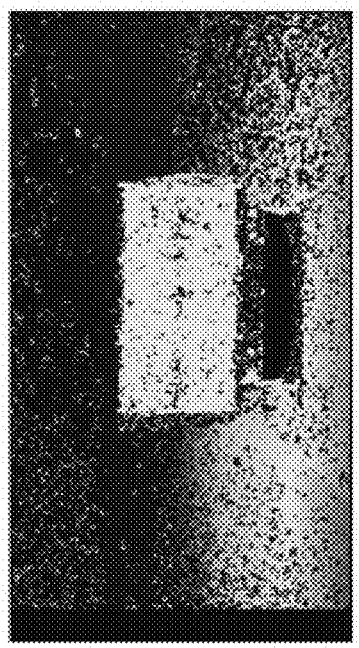

FIG. 3A illustrates an original left image, an original right image, and a disparity map obtained using them. Respective ranks of the original images (i.e., respective ranks of diagonal matrixes obtained by performing the singular value decomposition on matrixes corresponding to the original images) are 640.

Figure 3B:
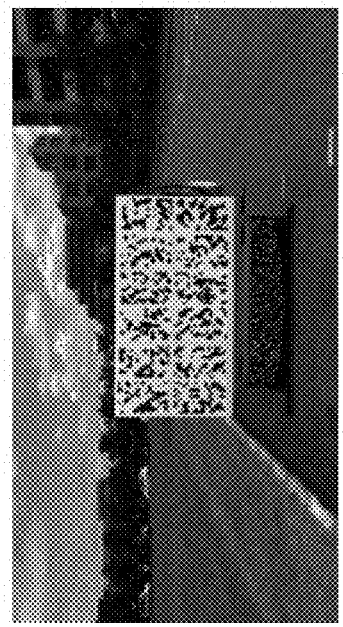
FIG. 3B is a diagram illustrating a left image and a right image that are subjected to low-rank approximation by singular value decomposition and a disparity map acquired, in the case in which the distance to the vehicle located in front is 5 m.
Figure 3B:
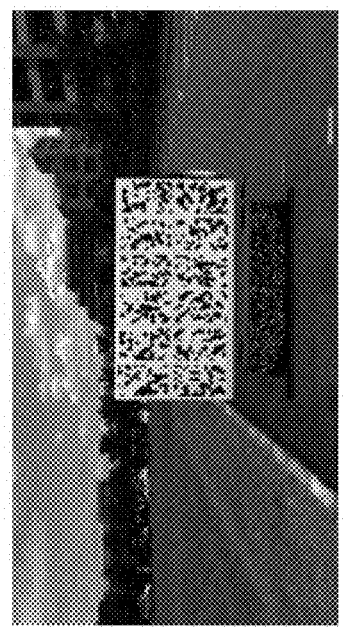
Figure 3B:
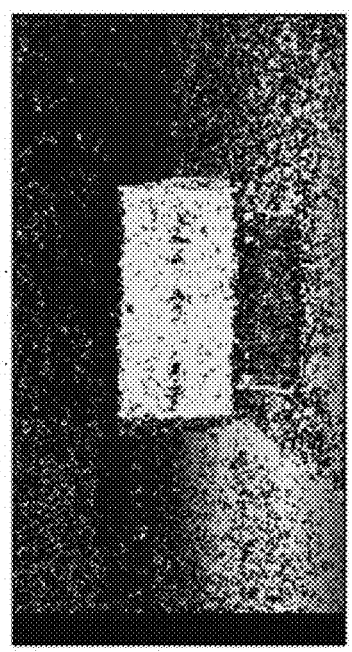

FIG. 3B illustrates a left image and a right image obtained by compressing a characteristics amount to 95% by performing the low rank approximation by the singular value decomposition on the left image and the right image, and a disparity map obtained using them. Ranks of the images subjected to the low rank approximation by the singular value decomposition are 214. In this case, in matrixes corresponding to the images subjected to the low rank approximation by the singular value decomposition, from among components of the matrixes corresponding to the original images, approximately 33% (=214/640×100) of the components remain, while other components are zero.

Figure 3C:
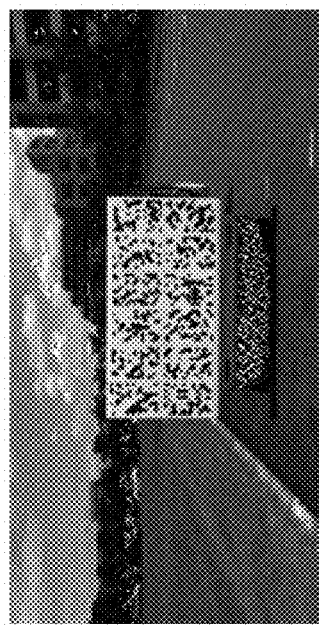
FIG. 3C is a diagram illustrating a left image and a right image that are subjected to the low-rank approximation by singular value decomposition and a disparity map acquired, in the case in which the distance to the vehicle located in front is 5 m.
Figure 3C:
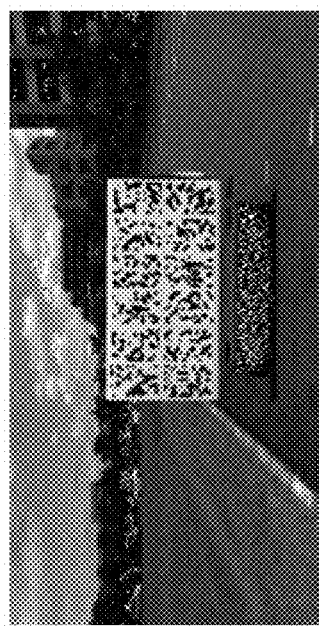
Figure 3C:
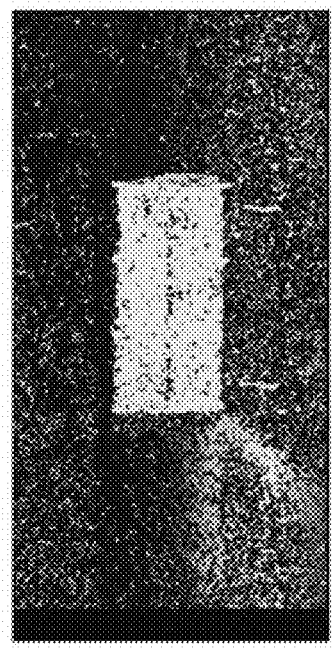

FIG. 3C illustrates a left image and a right image obtained by compressing a characteristics amount to 90% by performing the low rank approximation by the singular value decomposition on the left image and the right image, and a disparity map obtained using them. Ranks of the images subjected to the low rank approximation by the singular value decomposition are 127. In this case, in the matrixes corresponding to the images subjected to the low rank approximation by the singular value decomposition, from among components of the matrixes corresponding to the original images, approximately 19% (=127/640×100) of the components remain, while other components are zero.

Figure 3D:
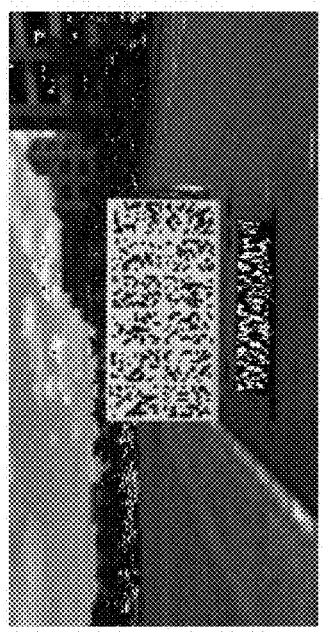
FIG. 3D is a diagram illustrating a left image and a right image that are subjected to the low-rank approximation by singular value decomposition and a disparity map acquired, in the case in which the distance to the vehicle located in front is 5 m.
Figure 3D:
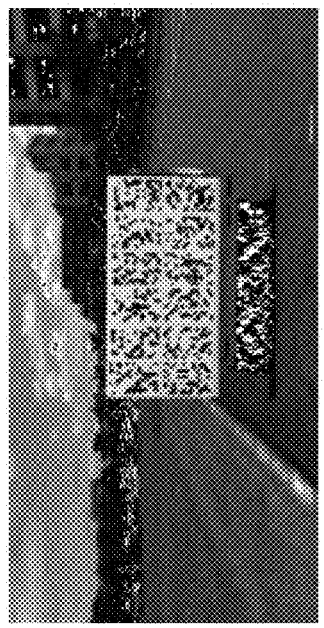
Figure 3D:
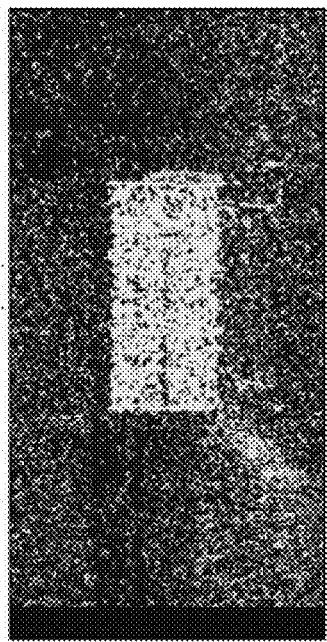

FIG. 3D illustrates a left image and a right image obtained by compressing a characteristics amount to 80% by performing the low rank approximation by the singular value decomposition on the left image and the right image, and a disparity map obtained using them. Ranks of the images subjected to the low rank approximation by the singular value decomposition are 64. In this case, in the matrixes corresponding to the images subjected to the low rank approximation by the singular value decomposition, from among components of the matrixes corresponding to the original images, approximately 10% (=64/640×100) of the components remain, while other components are zero.

FIG. 4A to FIG. 4D each illustrates a left image, a right image, and a disparity map obtained using the left image and the right image, in a case in which the distance to the vehicle located in front is 20 m.

Figure 4A:
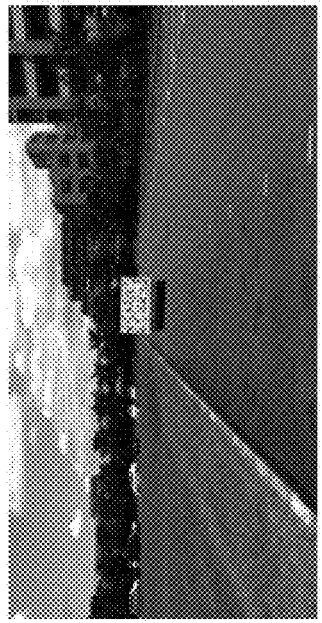
FIG. 4A is a diagram illustrating an original left image, an original right image, and a disparity map acquired, in a case in which the distance to the vehicle located in front is 20 m.
Figure 4A:
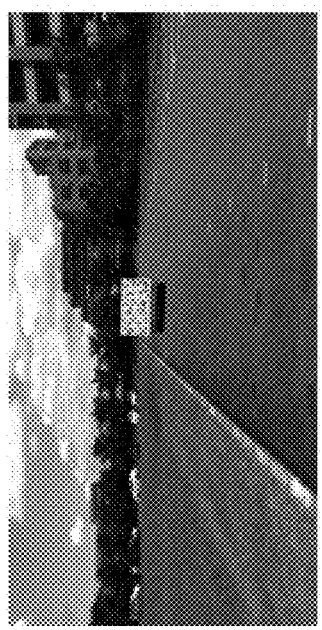
Figure 4A:
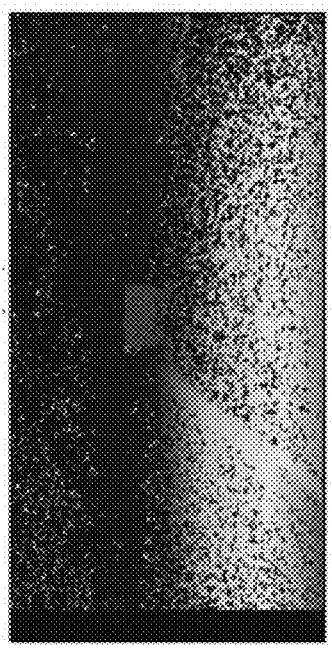

FIG. 4A illustrates an original left image, an original right image, and a disparity map obtained using them. Respective ranks of the original images are 640.

Figure 4B:
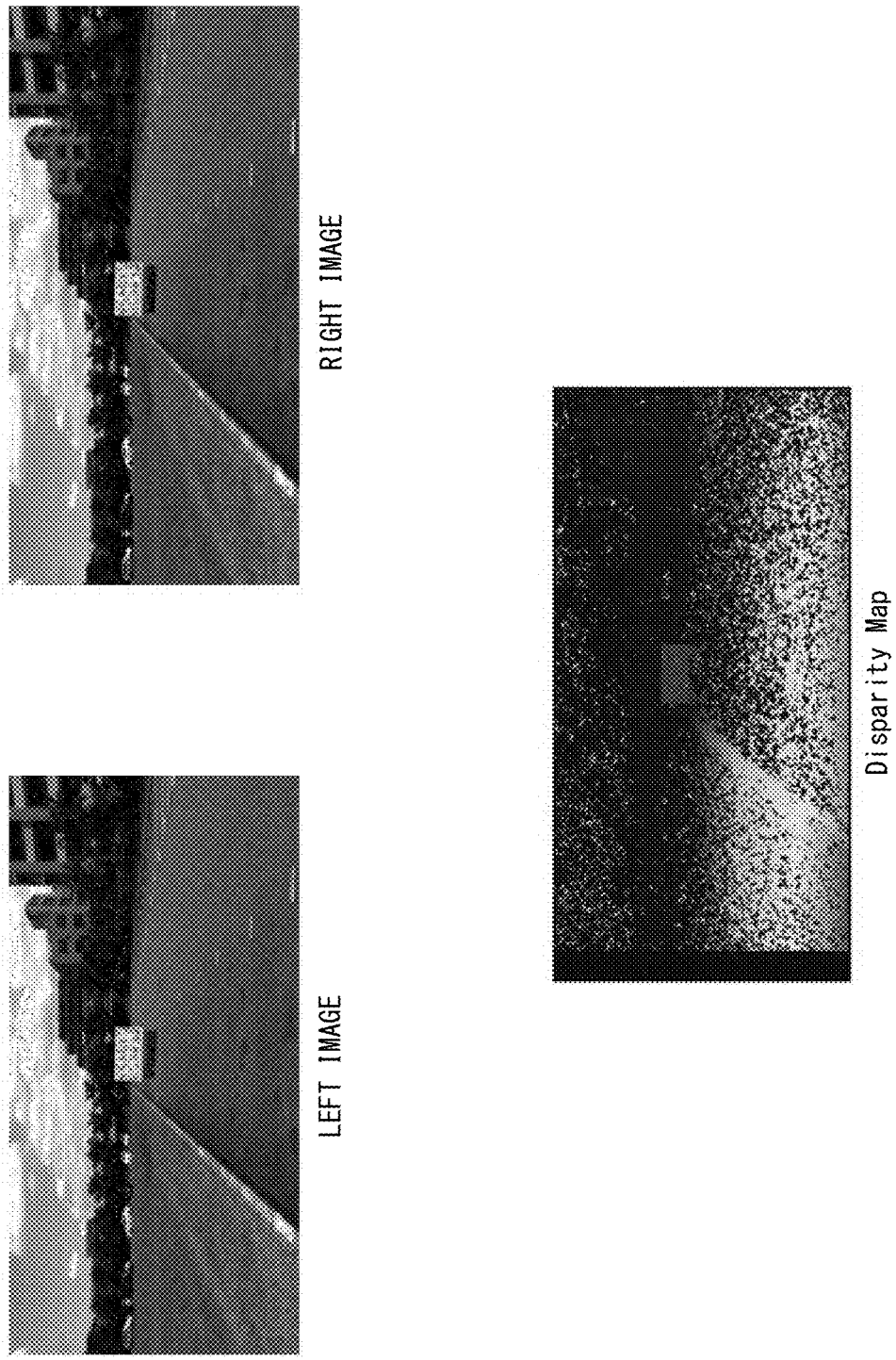
FIG. 4B is a diagram illustrating a left image and a right image that are subjected to the low-rank approximation by singular value decomposition and a disparity map acquired, in the case in which the distance to the vehicle located in front is 20 m.

FIG. 4B illustrates a left image and a right image obtained by compressing a characteristics amount to 95% by performing the low rank approximation by the singular value decomposition on the left image and the right image, and a disparity map obtained using them. Ranks of the images subjected to the low rank approximation by the singular value decomposition are 247. In this case, in matrixes corresponding to the images subjected to the low rank approximation by the singular value decomposition, from among components of the matrixes corresponding to the original images, approximately 38% (=247/640×100) of the components remain, while other components are zero.

Figure 4C:
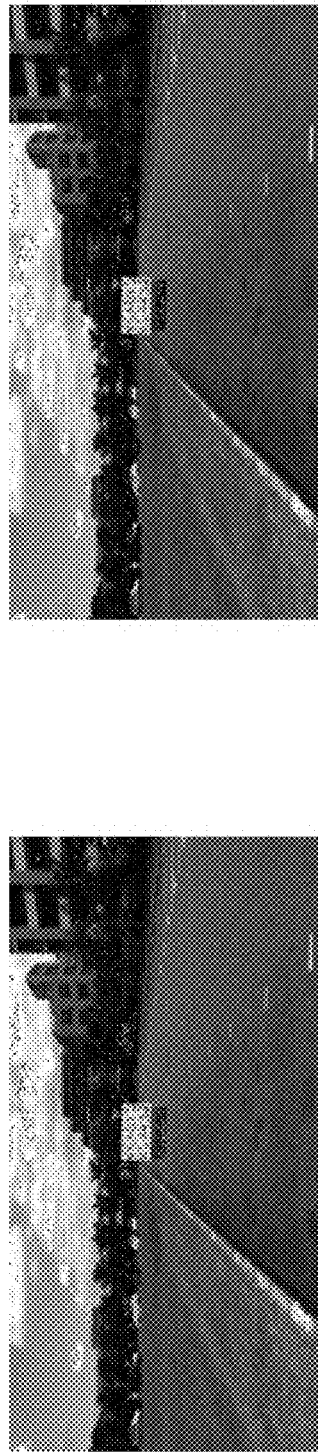
FIG. 4C is a diagram illustrating a left image and a right image that are subjected to the low-rank approximation by singular value decomposition and a disparity map acquired, in the case in which the distance to the vehicle located in front is 20 m.
Figure 4C:
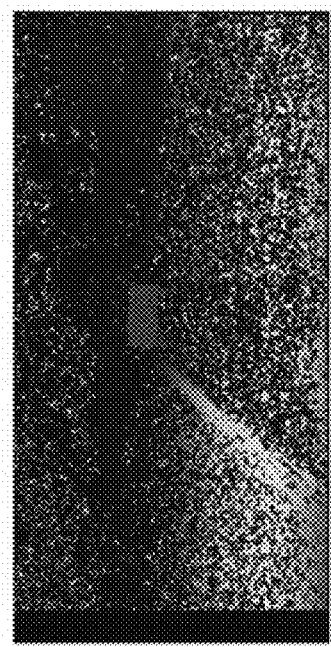

FIG. 4C illustrates a left image and a right image obtained by compressing a characteristics amount to 90% by performing the low rank approximation by the singular value decomposition on the left image and the right image, and a disparity map obtained using them. Ranks of the images subjected to the low rank approximation by the singular value decomposition are 147. In this case, in the matrixes corresponding to the images subjected to the low rank approximation by the singular value decomposition, from among components of the matrixes corresponding to the original images, approximately 22% (=147/640×100) of the components remain, while other components are zero.

Figure 4D:
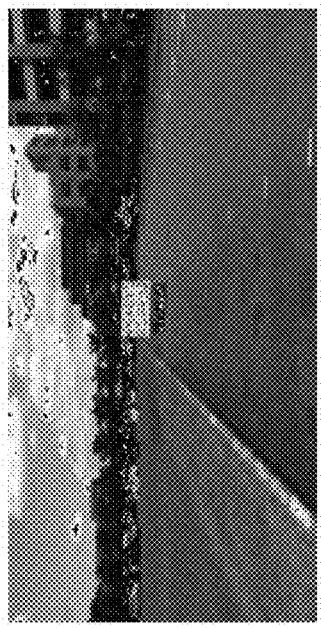
FIG. 4D is a diagram illustrating a left image and a right image that are subjected to the low-rank approximation by singular value decomposition and a disparity map acquired, in the case in which the distance to the vehicle located in front is 20 m.
Figure 4D:
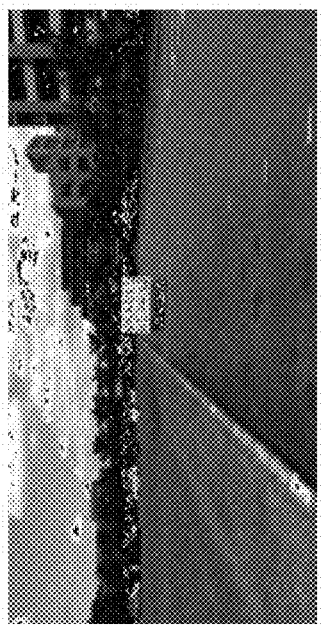
Figure 4D:
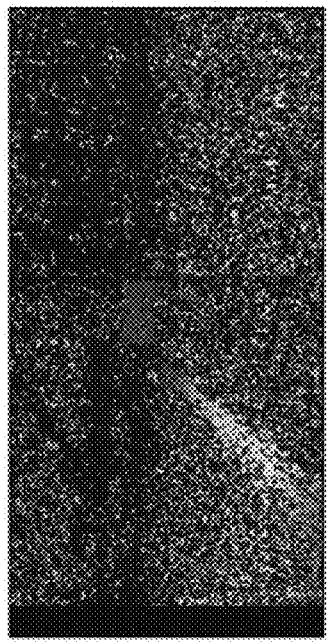

FIG. 4D illustrates a left image and a right image obtained by compressing a characteristics amount to 80% by performing the low rank approximation by the singular value decomposition on the left image and the right image, and a disparity map obtained using them. Ranks of the images subjected to the low rank approximation by the singular value decomposition are 67. In this case, in the matrixes corresponding to the images subjected to the low rank approximation by the singular value decomposition, from among components of the matrixes corresponding to the original images, approximately 10% (=67/640×100) of the components remain, while other components are zero.

FIG. 5A to FIG. 5D each illustrates a left image, a right image, and a disparity map obtained using the left image and the right image, in a case in which the distance to the vehicle located in front is 30 m.

FIG. 5A illustrates an original left image, an original right image, and a disparity map obtained using them. Respective ranks of the original images are 640.

Figure 5B:
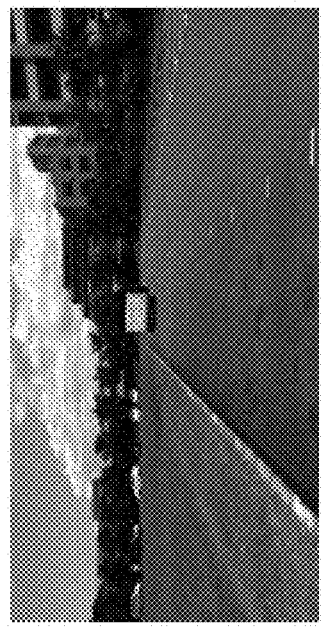
FIG. 5B is a diagram illustrating a left image and a right image that are subjected to the low-rank approximation by singular value decomposition and a disparity map acquired, in the case in which the distance to the vehicle located in front is 30 m.
Figure 5B:
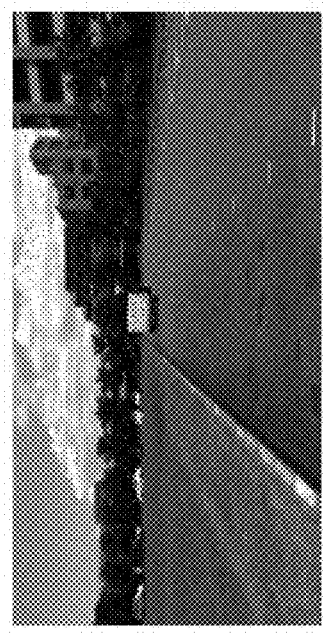
Figure 5B:
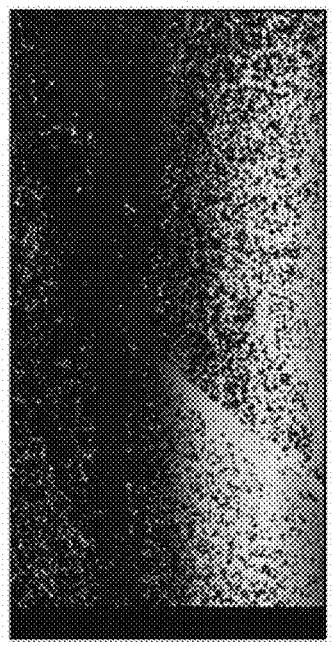

FIG. 5B illustrates a left image and a right image obtained by compressing a characteristics amount to 95% by performing the low rank approximation by the singular value decomposition on the left image and the right image, and a disparity map obtained using them. Ranks of the images subjected to the low rank approximation by the singular value decomposition are 249. In this case, in matrixes corresponding to the images subjected to the low rank approximation by the singular value decomposition, from among components of the matrixes corresponding to the original images, approximately 38% (=249/640×100) of the components remain, while other components are zero.

Figure 5C:
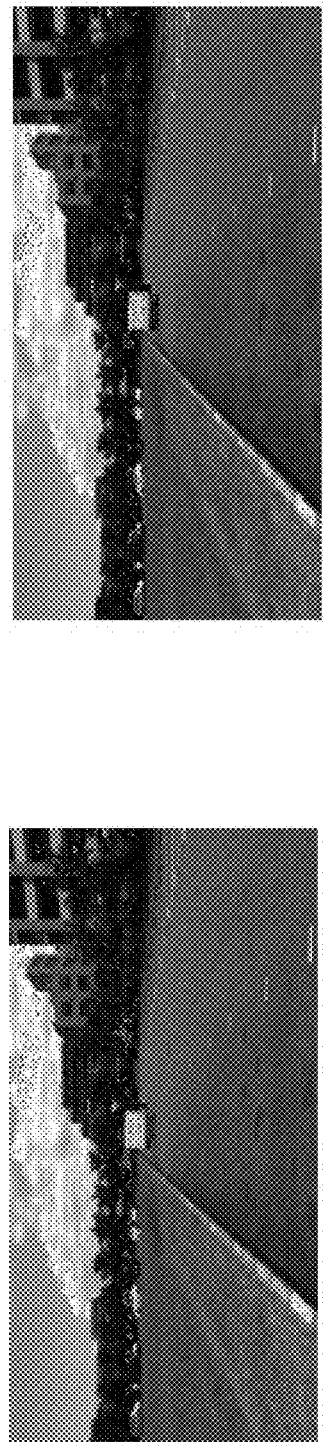
FIG. 5C is a diagram illustrating a left image and a right image that are subjected to the low-rank approximation by singular value decomposition and a disparity map acquired, in the case in which the distance to the vehicle located in front is 30 m.
Figure 5C:
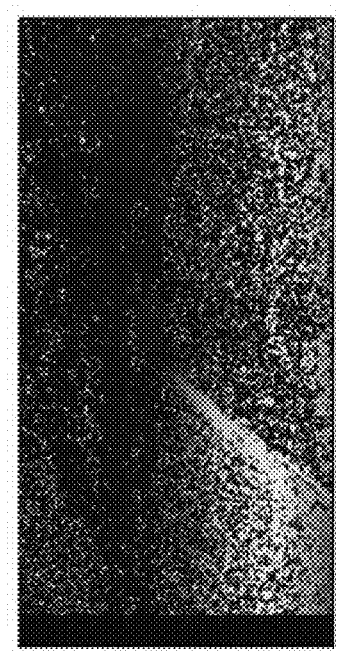

FIG. 5C illustrates a left image and a right image obtained by compressing a characteristics amount to 90% by performing the low rank approximation by the singular value decomposition on the left image and the right image, and a disparity map obtained using them. Ranks of the images subjected to the low rank approximation by the singular value decomposition are 149. In this case, in the matrixes corresponding to the images subjected to the low rank approximation by the singular value decomposition, from among components of the matrixes corresponding to the original images, approximately 23% (=149/640×100) of the components remain, while other components are zero.

Figure 5D:
FIG. 5D is a diagram illustrating a left image and a right image that are subjected to the low-rank approximation by singular value decomposition and a disparity map acquired, in the case in which the distance to the vehicle located in front is 30 m.
Figure 5D:
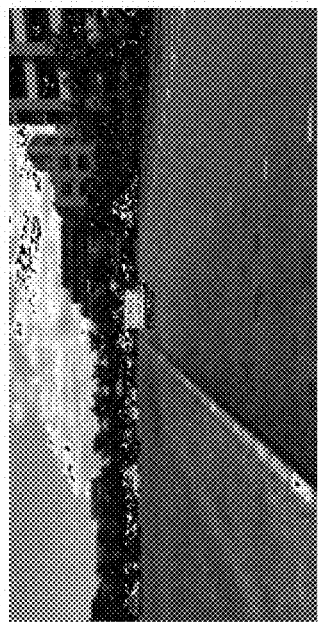
Figure 5D:
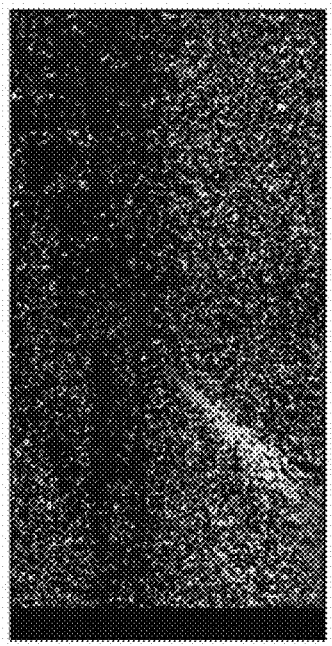

FIG. 5D illustrates a left image and a right image obtained by compressing a characteristics amount to 80% by performing the low rank approximation by the singular value decomposition on the left image and the right image, and a disparity map obtained using them. Ranks of the images subjected to the low rank approximation by the singular value decomposition are 66. In this case, in the matrixes corresponding to the images subjected to the low rank approximation by the singular value decomposition, among components of the matrix corresponding to the original images, approximately 10% (=66/640×100) of the components remain, while other components are zero.

As illustrated in FIG. 3A to FIG. 3D, in both the case in which the original left image and the original right image are used and the cases in which the left image and the right image that are subjected to the low-rank approximation by the singular value decomposition are used, the distance (5 m) to the vehicle located in front was accurately detected. Also, as illustrated in FIG. 4A to FIG. 4D and FIG. 5A to FIG. 5D, regardless of the long distance to the vehicle located in front, in the case in which the original left image and the original right image are used and in the cases in which the left image and the right image that are subjected to the low-rank approximation by the singular value decomposition are used, the distance to the vehicle located in front was accurately detected. Thus, it was confirmed that a decrease in the accuracy of the distance detection can be suppressed also in cases in which the images subjected to the low-rank approximation by the singular value decomposition are used.

As described above, for example, in the case in which the characteristics amount is compressed to 80% by performing the low rank approximation by the singular value decomposition, the matrixes corresponding to the images subjected to the low rank approximation by the singular value decomposition are sparse matrices in which approximately 10% of the components of the matrixes corresponding to the original images are remaining and the other components are 0. In the stereo matching processing using an image corresponding to such a sparse matrix, calculation for obvious results such as multiplying by 0 or adding 0 can be omitted, whereby the processing load of the stereo matching processing can be reduced.

Next, an image processing method of the image processing apparatus 10 according to the present embodiment will be described with reference to a flowchart illustrated in FIG. 6. The image processing apparatus 10 repeats the flow illustrated in FIG. 6 at, for example, predetermined time intervals.

The interface 12 acquires the standard image captured by the imaging unit 11a and the reference image captured by the imaging unit 11b (step S11). That is, the interface 12 acquires the stereo image including the standard image and the reference image captured from different viewpoints.

The processor 13 performs the low-rank approximation by the singular value decomposition on the standard image and the reference image acquired by the interface 12 (step S12).

Subsequently, the processor 13 calculates the parallax by performing the stereo matching processing between the standard image and the reference image that are subjected to the low-rank approximation by the singular value decomposition (step S13).

In the present embodiment, as described above, the image processing apparatus 10 includes the interface 12 configured to acquire the stereo image including the standard image and the reference image captured from different viewpoints and the processor 13 configured to perform the low-rank approximation by the singular value decomposition on the standard image and the reference image and to calculate the parallax by performing the stereo matching processing between the standard image and the reference image that are subjected to the low-rank approximation by the singular value decomposition.

By performing the low-rank approximation to lower the ranks of the diagonal matrixes obtained by performing the singular value decomposition on the matrixes corresponding to the standard image and the reference image, more elements become zero in the matrixes subjected to the low-rank approximation by the singular value decomposition. Because calculations for obvious results such as multiplying by 0 or adding 0 can be omitted, the processing load of the stereo matching processing can be reduced. Further, in the low-rank approximation by the singular value decomposition, less characteristic portions are preferentially compressed while characteristics portions remain, whereby a decrease in the accuracy of the stereo matching processing can be suppressed.

Although the present disclosure has been described based on the figures and the embodiments, it should be appreciated that those who are skilled in the art may easily perform variations or alteration based on the present disclosure. Accordingly, such variations and alterations are to be included in the scope of the present disclosure.

The invention claimed is:

1. An image processing apparatus comprising:
   an interface configured to acquire a stereo image that includes a standard image and a reference image captured from different viewpoints; and
   a processor configured to perform low-rank approximation by singular value decomposition on the standard image and the reference image, and calculate a parallax by performing stereo matching processing between the standard image and the reference image that are subjected to the low-rank approximation by the singular value decomposition,
   wherein the processor is configured to:
      decompose the standard image and the reference image acquired by the interface into a left singular value matrix, a first diagonal matrix, and a right singular value matrix, wherein an inner product of the left singular value matrix, a second diagonal matrix obtained by lowering a rank of the first diagonal matrix, and the right singular value matrix are defined as the standard image and the reference image that are subjected to the low-rank approximation by the singular value decomposition, and determine a rank of the second diagonal matrix, based on a desired characteristics amount in each of the standard image and the reference image that are subjected to the low-rank approximation by the singular value decomposition.

2. The image processing apparatus according to claim 1, wherein the processor is configured to vary the desired characteristics amount according to areas of the standard image and the reference image.

3. The image processing apparatus according to claim 1, wherein the standard image and the reference image are captured by an imaging apparatus mounted on a mobile body, and the processor is configured to vary the desired characteristics amount according to a behavior of the mobile body.

4. An imaging apparatus comprising:

a first camera that includes a first imaging optical system and a first image sensor configured to capture an image formed via the first imaging optical system;

a second camera that includes a second imaging optical system and a second image sensor configured to capture an image formed via the second imaging optical system, and is configured to capture from a different viewpoint that is different from a viewpoint of the first camera;

an interface configured to acquire a stereo image including a standard image captured by the first camera and a reference image captured by the second camera from the different viewpoint; and a processor configured to perform low-rank approximation by singular value decomposition on the standard image and the reference image, and calculate a parallax by performing stereo matching processing between the standard image and the reference image that are subjected to the low-rank approximation by the singular value decomposition, wherein the processor is configured to:

decompose the standard image and the reference image acquired by the interface into a left singular value matrix, a first diagonal matrix, and a right singular value matrix, wherein an inner product of the left singular value matrix, a second diagonal matrix obtained by lowering a rank of the first diagonal matrix, and the right singular value matrix are defined as the standard image and the reference image that are subjected to the low-rank approximation by the singular value decomposition, and determine a rank of the second diagonal matrix, based on a desired characteristics amount in each of the standard image and the reference image that are subjected to the low-rank approximation by the singular value decomposition.

5. A mobile body equipped with the image processing apparatus according to claim 1.

6. An image processing method of an image processing apparatus, the imaging processing method comprising:

acquiring a stereo image including a standard image and a reference image that are captured from different viewpoints;

performing low-rank approximation by singular value decomposition on the standard image and the reference image;

calculating a parallax by performing stereo matching processing between the standard image and the reference image that are subjected to the low-rank approximation by the singular value decomposition;

decomposing the standard image and the reference image acquired by the interface into a left singular value matrix, a first diagonal matrix, and a right singular value matrix, wherein an inner product of the left singular value matrix, a second diagonal matrix obtained by lowering a rank of the first diagonal matrix, and the right singular value matrix are defined as the standard image and the reference image that are subjected to the low-rank approximation by the singular value decomposition; and determining a rank of the second diagonal matrix, based on a desired characteristics amount in each of the standard image and the reference image that are subjected to the low-rank approximation by the singular value decomposition.

7. The imaging apparatus according to claim 4, wherein the processor is configured to vary the desired characteristics amount according to areas of the standard image and the reference image.

8. The imaging apparatus according to claim 4, wherein the imaging apparatus is mounted on a mobile body, and the processor is configured to vary the desired characteristics amount according to a behavior of the mobile body.

9. The image processing method according to claim 6, further comprising varying the desired characteristics amount according to areas of the standard image and the reference image.

10. The image processing method according to claim 6, wherein the standard image and the reference image are captured by an imaging apparatus mounted on a mobile body, and the image processing method further comprises varying the desired characteristics amount according to a behavior of the mobile body.

* * * * *